United States Patent
Juilland et al.

(10) Patent No.: US 10,029,951 B2
(45) Date of Patent: Jul. 24, 2018

(54) RETRIEVING AGGREGATES AND POWDERY MINERAL MATERIAL FROM DEMOLITION WASTE

(71) Applicant: SIKA TECHNOLOGY AG, Zugerstrasse (CH)

(72) Inventors: Patrick Juilland, Bern (CH); Emmanuel Gallucci, Zurich (CH); Arnd Eberhardt, Winterhur (CH)

(73) Assignee: SIKA TECHNOLOGY AG, Baar (CH)

( * ) Notice: Subject to any disclaimer, the term of this patent is extended or adjusted under 35 U.S.C. 154(b) by 299 days.

(21) Appl. No.: 14/778,857

(22) PCT Filed: Mar. 26, 2014

(86) PCT No.: PCT/EP2014/056047
§ 371 (c)(1),
(2) Date: Sep. 21, 2015

(87) PCT Pub. No.: WO2014/154741
PCT Pub. Date: Oct. 2, 2014

(65) Prior Publication Data
US 2016/0046532 A1 Feb. 18, 2016

(30) Foreign Application Priority Data
Mar. 28, 2013 (EP) .................................... 13161551

(51) Int. Cl.
| | | |
|---|---|---|
| *C04B 41/00* | (2006.01) | |
| *C04B 20/02* | (2006.01) | |
| *C04B 20/00* | (2006.01) | |
| *C04B 28/02* | (2006.01) | |
| *C04B 18/16* | (2006.01) | |

(52) U.S. Cl.
CPC ............ *C04B 41/00* (2013.01); *C04B 18/167* (2013.01); *C04B 20/0076* (2013.01); *C04B 20/023* (2013.01); *C04B 20/026* (2013.01); *C04B 28/02* (2013.01); *Y02W 30/95* (2015.05)

(58) Field of Classification Search
CPC ..... C04B 28/02; C04B 18/167; C04B 20/023; C04B 20/026; C04B 20/0076; C04B 41/00
See application file for complete search history.

(56) References Cited

FOREIGN PATENT DOCUMENTS

| | | |
|---|---|---|
| JP | 5-238792 A | 9/1993 |
| JP | 2010-254503 A | 11/2010 |
| KR | 10-2007-0024193 A | 3/2007 |
| KR | 20070024193 A | 3/2007 |
| KR | 10-0950097 B1 * | 3/2010 |
| KR | 10-0950099 B1 | 3/2010 |
| WO | WO 2010/110563 A2 | 9/2010 |
| WO | WO 2011/038123 A1 | 3/2011 |

OTHER PUBLICATIONS

Machine Translation of Japanese Patent Specification No. JP 05-238792 A (Sep. 1993).*
Machine Translation of Japanese Patent Specification No. JP 2010-254503 A (Nov. 2010).*
Machine Translation of Korean Patent Specification No. KR 1020070024193 B1 (Mar. 2007).*
Office Action (Communication pursuant to Article 94(3) EPC) dated Oct. 17, 2016, by the European Patent Office in corresponding European Patent Application No. 14713818.4. (3 pages).
International Search Report (PCT/ISA/210) dated Jun. 16, 2014, by the European Patent Office as the International Searching Authority for International Application No. PCT/EP2014/056047.
Written Opinion (PCT/ISA/237) dated Jun. 16, 2014, by the European Patent Office as the International Searching Authority for International Application No. PCT/EP2014/056047.
Jul. 28, 2017 Office Action issued in Chinese Patent Application No. 201480017581.8.
Office Action (Notification of the First Office Action) dated Nov. 14, 2016 by the State Intellectual Property Office of the People's Republic of China in corresponding Chinese Patent Application No. 201480017581.8, and an English Translation of the Office Action. (18 pages).
Jan. 30, 2018 Office Action issued in Chinese Application No. 201480017581.8.

* cited by examiner

*Primary Examiner* — Anthony J Green
(74) *Attorney, Agent, or Firm* — Oliff PLC

(57) ABSTRACT

A method for retrieving aggregates and/or powdery mineral material from a source material comprising hardened mineral binder and aggregates, in particular a waste or demolition material, comprises the steps of: a) treating the source material in a disintegration process and (b) separation of the treated source material at a predefined cut-off grain size in order to retrieve treated aggregates with a grain size of at least the predefined cut-off grain size and/or in order to retrieve powdery mineral material with a grain size below the predefined cut-off grain size.

27 Claims, 2 Drawing Sheets

RETRIEVING AGGREGATES AND POWDERY MINERAL MATERIAL FROM DEMOLITION WASTE

TECHNICAL FIELD

The invention relates to a method for retrieving aggregates and/or powdery mineral material from a source material comprising hardened mineral binder and aggregates, in particular a waste or demolition material. Furthermore, the invention is concerned with aggregates and powdery mineral material obtained by the method as well as a composition, in particular a mortar or concrete composition, comprising a mineral binder and retrieved aggregates and/or retrieved powdery mineral material.

BACKGROUND ART

So far, a large amount of demolition or construction waste, such as e.g. hardened concrete or mortar, is disposed in landfills and minor quantities are partially reused as raw material for low-tech applications in the construction industry.

Current practice is that demolition waste material, i.e. concrete, is crushed and only the coarse fractions are being reused, the smaller ones being discarded due to compromising effect on the properties of fresh and hardened concrete. Therefore, current practice can only be considered incomplete and down-cycling.

However, demolition waste usually comprises significant amounts of useful constituents, e.g. aggregates or binder components, which can in principle completely be recycled and re-used for new construction works. Moreover, in certain regions and countries the disposal of wastes has become more and more expensive and difficult due to new legislations in recent years. In Europe for example, the European directive 2009/98/CE requires a reuse of at least 70 wt.-% of inert demolition waste up to the year 2020. Thus, recycling of demolition or construction waste becomes an important issue in the near future.

Methods for recycling waste concrete or mortar known so far include for example crushing, processing of waste hardened concrete with high performance ultra-sound or sonic impulses, thermal treatment at temperatures above 600° C. or lixiviation with acids. These methods aim in particular at retrieving aggregates.

Also known are clogging treatments which aim at closing pores of the cementitious materials covering the surface of the aggregates in order to improve the quality of the so called recycled concrete aggregates (RCA). Clogging can e.g. be achieved by forming a rim of carbonated cementitious material around the aggregates with the help of carbon dioxide enriched air or by formation of an organic film of polyvinyl acetate (PVA) around the aggregates.

However, these known strategies either require lots of energy, sophisticated equipment or problematic chemicals or the material retrieved is of medium to low quality.

There is thus a need to develop alternative and improved methods which overcome the aforementioned drawbacks and allow retrieving as much of the constituents of demolition waste in best possible quality.

DISCLOSURE OF THE INVENTION

It is an object of the present invention to provide a more efficient recycling process for waste building or demolition material, in particular waste mortar or concrete. Especially, the method should allow for retrieving aggregates and/or building materials from a source material comprising hardened mineral binder and aggregates. More specifically, the method should facilitate retrieving aggregates and/or fine grained or powdery mineral materials which are suitable for re-use in binder compositions, especially in hydraulically settable binder compositions, without negatively affecting the properties of the settable binder compositions or products made thereof.

Surprisingly, it has been found that the above mentioned problems can be solved by the features of claim 1.

Accordingly, the core of the invention relates to a method for retrieving aggregates and/or powdery mineral material from a source material comprising hardened mineral binder and aggregates, in particular a waste or demolition material, comprising the steps of:

a) Treating the source material in a disintegration process, in particular under abrasive conditions, wherein the hardened mineral binder is at least partially, in particular essentially completely, carbonated and removed from the surface of the aggregates such that a powdery disintegration product is produced;

b) Separation of the treated source material at a predefined cut-off grain size in order to retrieve treated aggregates with a grain size of at least the predefined cut-off grain size and/or in order to retrieve powdery mineral material with a grain size below the predefined cut-off grain size.

It was found that treating the source material according to step a) leads to an efficient disintegration of the hardened mineral binder, especially if the mineral binder comprises or consists of hardened or hydrated cementitious material. In this process the hardened mineral binder is disintegrated or decomposed, respectively, into a fine grain or powdery decomposition product, and effectively removed from the surface of the aggregates in the source material. Thus, with the inventive method, the surface of the aggregates can be cleaned of hardened binder material to a large extent. Therefore the retrieved or recycled aggregates have a quality which is very close to neat aggregates.

In contrast, recycling processes known so far usually produce aggregates of minor quality due to significant amounts of cementitious residues remaining on the surface of the aggregates. When re-using these aggregates e.g. for concrete compositions, the remaining residues usually lead to high water demand of the concrete produced thereof. This in turn may compromise workability of fresh concrete or give rise to undesirably high admixture concentrations for neutralizing the high water demand. Therefore, the amount of recycled aggregates which today are usually used in mortar or concrete compositions is limited. Furthermore the increase in water demand leads generally to rather poor ultimate mechanical strengths of concrete produced with common recycled concrete aggregates (RCA). This in turn confines the use of common RCA to low-tech applications.

Moreover, drying shrinkage of concrete with normal recycled concrete aggregates is usually too high and a real problem. Drying shrinkage of concrete originates from the porosity of the hydrated binder material or matrix and its volume fraction in concrete. Using normally recycled aggregates from crushed concrete leads to an increase of the total volume of hydrated binder matrix (new binder and residual binder of the recycling aggregates). This is the main reason for the increased drying shrinkage of concrete produced with common recycled concrete aggregates. However, using aggregates retrieved from the inventive recycling process bears an important advantage. It is that the removal of hydrated matrix enables to produce concrete having similar shrinkage as a reference concrete containing neat aggregates.

In addition, the treatment of the source material according to the invention produces a useful fine grain or powdery carbonation or disintegration product of the hardened binder material which can be retrieved in the form of a fine grain or powdery mineral material after separation of the aggregates. The fine grain disintegration or decomposition product, in particular comprising calcite, amorphous silica and aluminates, can e.g. be used as filler and/or as supplementary cementitious material (SCM) in binder compositions and/or as raw material for cement production. Specifically, the fine grain decomposition product can for example be used for reducing the clinker factor of cement and/or composite binders, similar to the use of other SCM such as e.g. fly ash, slag and the like. Especially, the element oxide composition of the inorganic powder is similar to the one of mineral binders. The calcium/silicon ratio determining the hydraulicity of a supplementary cementitious material is particularly good. Again, this is an important advantage and originates from the possibility of a nearly complete separation of the aggregates from the hardened binder material or matrix.

Also in regard to environmental aspects, the method of the invention is beneficial. First, due to the method of the present invention, the amount of waste or demolition material that has to be deposited or landfilled can significantly be reduced. Second, the present invention helps in reducing the consumption of natural resources, i.e. mainly aggregates but also raw material for cement production. Third, because of retrieving highly cleaned aggregates, their further use in construction material does not have to be limited to low-tech applications. Such aggregates can be considered having similar properties as neat aggregates.

If for carbonation carbon dioxide is used and consumed, the method of the invention is further advantageous in terms of production and emission of carbon dioxide. Overall, these effects of the invention help to reduce negative impacts on the environment.

Moreover, the powdery mineral material produced can be used as a raw material for ash improvement technology as described e.g. in WO 2011/038123 A1. In ash improvement technology, coal combustion products are blended with metal oxides in order to improve the hydraulicity of the ashes. In particular, such products can be used as supplementary cementitious materials.

Additional aspects of the invention are subject of further independent claims. Particularly preferred embodiments are outlined throughout the description and the dependent claims.

WAYS OF CARRYING OUT THE INVENTION

A first aspect of the invention relates to a method for retrieving aggregates and/or powdery mineral material from a source material comprising hardened mineral binder and aggregates, in particular a waste or demolition material, comprising the steps of:
a) Treating the source material in a disintegration process, in particular under abrasive conditions, wherein the hardened mineral binder is at least partially, in particular essentially completely, carbonated and removed from the surface of the aggregates such that a powdery disintegration product is produced;
b) Separation of the treated source material at a predefined cut-off grain size in order to retrieve treated aggregates with a grain size of at least the predefined cut-off grain size and/or in order to retrieve powdery mineral material with a grain size below the predefined cut-off grain size.

In the present context, the term "source material" stands for any material comprising or consisting of hardened mineral binder and aggregates. In particular, the source material is a demolition or waste material originating from demolished constructions or buildings. The source material may come from demolition sites and/or from landfills. Beside the hardened mineral binder and the aggregates, further materials can be present in the source material, for example metals, plastics and/or wood. However, it might be beneficial to at least partially separate such type of materials before treating the source material. Preferably, the source material comprises or consists of hardened mortar and/or concrete.

Especially, the source material to be treated comprises or consists of hardened mineral binder bound to the surface of the aggregates. In particular, the hardened mineral binder at least partially encloses the aggregates and/or binds together several individual aggregates.

According to a preferred embodiment, the source material is crushed prior to the disintegration process or step a). This will increase the surface of the source material which in turn enhances the disintegration process. The expression "hardened mineral binder" in particular refers to a mineral binder that has hardened in a chemical hydration reaction which produced hydrates. Preferably, the hardened mineral binder has hardened for at least 2 days, preferably at least 7 days, especially, at least 28 or at least 60 days.

In particular the hardened mineral binder comprises or consists of hardened hydraulic binder, e.g. hardened cementitious binder.

However, the hardened mineral binder can comprise or consist of hardened latent hydraulic and/or pozzolanic binder materials as well.

The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, activated clays and/or natural pozzolanes.

In particular, the hardened mineral binder comprises or consists of 5-100 wt. %, especially 50-100 wt.-%, more preferably, 65-100 wt.-%, of hardened hydraulic binder.

Especially, the hardened mineral binder comprises or consists of 5-95 wt.-% of hardened hydraulic binder and 95-5 wt.-% of hardened latent hydraulic and/or pozzolanic binder material. More preferably, the hardened mineral binder can comprise or consist of 30-90 wt.-% of hardened hydraulic binder and 70-10 wt.-% of hardened latent hydraulic and/or pozzolanic binder material.

Preferred hardened mineral binder comprise or consist of hardened cements of type CEM I, II, III, IV or V according to norm EN 197, in particular of type CEM I or II. However other types of cements can be used as well.

In particular, the hardened hydraulic binder is hardened cement. Preferably, the hardened latent hydraulic and/or pozzolanic binder material is hardened slag and/or fly ash. A highly preferred hardened latent hydraulic binder material is hardened slag.

The term "aggregates" includes any type of mortar and/or concrete aggregates. In particular, the aggregates feature a density of 2.2-3 $kg/dm^3$. Especially, the aggregates include stone, gravel, sand or mixtures thereof. However the aggregates may comprise or consist of lightweight aggregates, in particular foamed clay or polystyrene, or heavy aggregates, such as barite, iron ore and the like.

In particular, a grain size of the aggregates is at least 0.125 mm or at least 0.250 mm. Preferably, the grain size of the aggregates at most 125 mm or at most 32 mm. Especially, the grain size of the aggregates is 0.125-125 mm, especially from 0.125-32 mm, in particular from 0.125-16 mm, for example from 0.125-8 mm or from 0.125-5 mm.

Within the present context, the grain size is determined by sieve analysis, in particular with sieves featuring square openings. Especially, the grain size is expressed by the opening size of the test sieves just passed by the grains or particles concerned.

The term "carbonation" stands for a process which is essentially the reversal of the chemical process of calcination which takes place for example in a cement kiln.

In particular, "carbonation" means the incorporation of carbon dioxide into chemical compounds or the chemical reaction of carbon dioxide with the source material. Thus, "carbonation" stands in particular for a carbon dioxide treatment of the source material. To some extent, carbonation of hardened mineral binder, e.g. mortars or concrete, occurs naturally. However, here the term "carbonation" stands for a process in which the carbonation is specifically enhanced or accelerated compared to the natural process. This can be achieved by providing excess carbon dioxide.

For example, hardened mineral binder in the form of hydraulic cementitious material, which essentially consists of calcium, silicate and aluminium hydrates, can react with carbon dioxide resulting in corresponding carbonates.

Basically, the microstructure of the hardened mineral binder or the binder matrix determines the rate of carbonation and the progress of a carbonation front from the exposed surface of the cementitious material towards its core.

Because ingress of gases and liquids into hardened mineral binder material is heavily compromising its durability, mortars and concretes are preferably designed as impermeable as possible, i.e. to slow down natural carbonation to a minimum rate.

So far, crushed source materials material has been treated with carbon dioxide to achieve clogging of the pore space of the hydrated binder matrix. This is known to originate from a volume increase as a result of the chemical reaction of carbon dioxide and a specific mineral hydrate of the hardened binder matrix. The benefit of such treatment is that clogging helps to some extent at decreasing the undesired water uptake of the material when used as recycled concrete aggregate in mortar and concrete.

However, clogging of the surface porosity of the hardened binder matrix leads to a decreased permeability for gases, i.e. the carbon dioxide used in such a process, which means that the hardened binder matrix can only be partially carbonated within reasonable time. Depending on the particle size of the crushed material and the clogging efficiency, complete carbonation based on gas diffusion through vapour or water filled porosity may last for years or even decades. Moreover, this process does not aim at disintegrating the hardened mineral binder to retrieve aggregates with improved quality.

In contrast, the carbonation process of the present invention follows a completely different goal. It targets the complete disintegration of the hardened mineral binder through carbonation and additionally removal of the carbonated front, in particular by abrasion or attrition. This will enable the newly exposed surface to carbonate rapidly again. The treatment is being conducted continuously in an iterative process until a desired degree of removal (in particular an essentially complete removal) of the hardened mineral binder is achieved. Based on thermodynamic consideration it can be shown that hydrated mineral binder such as cementitious binder can in principle be completely carbonated resulting in calcium carbonates, amorphous silica, alumina etc. However, kinetics of the carbonation reaction are essentially determined by the size of the crushed aggregates as well as by the permeability of the binder matrix as described above.

Hence, in the process of the present invention the hardened mineral binder is additionally removed from the surface of the aggregates. In particular the hardened mineral binder is simultaneously and/or continuously carbonated and removed from the surface of the aggregates.

Due to the removal of the carbonated material, clogging cannot establish. In return, this enables a fast access of carbon dioxide to the reactive material and accelerates the overall rate of reaction. This is sharp contrast to ordinary $CO_2$ treatments known so far: If the carbonated material is not removed from the surface of the aggregates, in particular under non-abrasive conditions, clogging will occur unavoidably.

Preferably, the disintegration process or step a) is carried out under abrasive conditions. These are conditions where the source material and possibly formed disintegration products move against each other in close contact. This will give rise to high shear forces and friction. Finally, these processes will result in an effective removal of hardened mineral binder and/or carbonated material from the surface of the aggregates by mechanical abrasion or attrition.

In particular, in step a), the hardened mineral binder and/or carbonated material is removed from the surface of the aggregates by mechanical abrasion and/or attrition. Removal is in particular effected by mechanical force acting on the source material. Mechanical force will result in high granular friction, impact and abrasion or attrition of the source material or the hardened mineral binder and/or carbonated material, respectively.

The mechanical force and/or abrasion may be induced by agitation of the source material. Thereby, the source material is for example confined in a defined volume and subjected to agitation. This will in particular induce high shear forces and abrasion or attrition.

Preferably, a density of solid material, in particular source material and/or carbonated material, in the processing volume is about 10-80 Vol.-%, especially 15-75 Vol.-%, in particular 20-70 Vol.-%, more preferably 30-65 Vol.-% or 40-60 Vol.-%. The term "processing volume" stands for the volume where the mechano-chemical process is effectively carried out. In other words the processing volume is defined to be the space in which the material to be treated, in particular the source material, is exposed to carbonation and/or abrasion and/or attrition.

In particular the material to be processed, in particular the source material, fills the processing volume according to the above densities, such that upon agitation of the material abrasive contacts between particles are imposed. For agitation and/or in order to induce abrasive conditions, a stirring device, a mechanical mixer, a rotating drum, a crusher, an extruder, ultrasound treatment, vibrating, fluid flow or combinations thereof may be used.

Especially, agitation of the source material leads to friction and abrasion of the hardened mineral binder and/or the carbonated material. In return, this will increase the carbonation rate. Overall, agitation and/or abrasion results in an improved throughput or efficiency of the whole disintegration process. Thus, the disintegration process according to the present invention consists of the combination of (i) a chemical process, i.e. carbonation, which decomposes the hardened mineral binder and (ii) the removal of the decomposition or carbonation products from the surface of the aggregates. These two processes interact synergistically and accelerate the overall disintegration process significantly.

In particular, these two processes run simultaneously and iteratively until a desired degree of removal is achieved or until essentially clean aggregates are obtained.

Specifically, due to the removal of the decomposition or carbonation products from the surface of the aggregates (ii), unreacted hardened mineral binder being present in lower layers is exposed step by step and chemically reacted in the carbonation process (i). This interplay between chemical and mechanical process is in particular very effective and results in very clean aggregates. Another advantage of the present invention is the ease of separation of cleaned aggregates and the disintegration products. The microstructure of hardened mineral binder, especially hardened cementitious binder, consists of hydrate phases in the range of nanometers to micrometers. Through the disintegration process the disintegration products are present as fine grain or powdery products, with grain sizes ranging from nanometers to several micrometers. Typically, the grain size of the powdery disintegration product is in the range of 0-0.250 mm or 0-0.125 mm. This fact bears several advantages. First, this facilitates the separation of the disintegration products from the cleaned aggregates. Secondly, this implies that the fine grain disintegration products can be used e.g. as filler for various industrial applications or as a base material for cementitious materials without the need of further mechanical treatment such as grinding.

Surprisingly, this new method, which can be seen as a combined chemo-mechanical process, comprises high efficiency for both the rate of disintegration as well as the separation of clean aggregates and disintegrated hardened mineral binder.

Especially, the treating of the source material takes place in presence of water. The water can e.g. be present in the form of a gas and/or of a liquid.

Preferably, the treating of the source material takes place in a liquid, in particular in an aqueous liquid, preferably in water. This means that the source material is at least partially, in particular fully, immersed in the liquid.

However, it is also possible to carry out the treatment with wetted source material and/or under humid conditions. Humid conditions in particular means a relative humidity of 40-100%.

Carbonation is in particular effected by carbon dioxide treatment of the source material. The carbon dioxide can be a product or by-product of any industrial process. Preferentially, essentially pure carbon dioxide is used. A purity of the carbon dioxide is preferably >1 wt.-%, for example >8 wt.-%, preferably >50 wt.-%, in particular >95 wt.-%, especially >99 wt.-%. With regard to the efficiency of the treatment, essentially pure carbon dioxide is most favorable.

However mixtures of carbon dioxide with other substances, such as water vapor, nitrogen and the like, e.g. air, can be used as well. Such mixtures in particular comprise $CO_2$ in an amount >1 wt.-%, for example >8 wt.-%, preferably >10 wt.-%, especially preferred >50 wt.-%, in particular >95 wt.-%, especially >99 wt.-%. The concentration of $CO_2$ used is in particular beyond the $CO_2$ concentration of normal air.

According to a preferred embodiment, exhaust gas from an industrial processes and/or a mixture of carbon dioxide with other substances can be used for carbonation or step a).

Advantageously the exhaust gas or the mixture comprises about 5-25 wt.-% $CO_2$, preferably 8-20 wt.-% $CO_2$ or 10-15 wt.-% $CO_2$.

The carbon dioxide can be added in gaseous form, in solid form or in liquid form.

As well the carbon dioxide used might be obtained from an in-situ decomposition of organic or inorganic substances, in particular carbonates, or from oxidation of carbon monoxide. Suitable carbonates are e.g. carbonate salts, alkene carbonates and the like.

Most preferred, the carbonation of the source material takes place in a liquid, and carbon dioxide is added in gaseous form into the liquid. Thereby, the liquid is in particular an aqueous liquid, preferably water. This causes the carbon dioxide to dissolve in the aqueous liquid or water.

Preferably, a density of solid material, in particular source material and/or carbonated material, in the liquid, which is especially water, is about 10-80 Vol.-%, especially 15-75 Vol.-%, in particular 20-70 Vol.-%, more preferably 30-65 Vol.-% or 40-60 Vol.-%. If source material is subjected to mechanical force under such conditions, effective abrasion or attrition of the hardened mineral binder and/or carbonated material is induced. In other words, such concentrations results in highly abrasive conditions.

In contrast, with densities below 10 Vol.-% of solid material in the liquid, the mechanical force or abrasion will in general be much less effective and removal of the hardened mineral binder and/or carbonated material from the surface of the aggregates becomes difficult or even impossible. This is in particular due to the fact that under these conditions, the solid material in the liquid is rather far away separated. Consequently most of the time there is hardly any mechanical contact produced between particles of the solid material.

Especially, the carbon dioxide is added in gaseous form into the liquid such that bubbles are formed. Bubbles help to remove the carbonation products or the disintegration products from the surface of the aggregates.

Advantageously the treatment of the source material with carbon dioxide is conducted at atmospheric pressure. However, lower or higher pressures are possible as well.

The amount of carbon dioxide required for the treatment depends on the proportion of hardened binder present in the source material. The more hardened binder the more carbon dioxide is necessary.

Especially, the treatment takes place at a temperature between −10-100° C., especially between −5-75° C. or 5-40° C. However, for example under humid conditions, the treatment may take place above 100° C.

In particular, the treatment of the source material is performed as long as new disintegration or carbonation products are formed. This means in particular, that the treatment is performed as long as significant or measurable amounts of new disintegration or carbonation products are formed.

Especially, the treatment in step a) is performed until an amount of hardened mineral binder and carbonated hardened mineral binder bound to the aggregates is 0.0001-50 wt.-%, in particular 0.001-25 wt.-%, especially 0.001-10 wt.-%, preferably 0.01-1 wt.-%, with respect to the overall weight of the aggregates.

In particular, the treatment in step a) is performed until a porosity, measured according to norm EN 1097-6, of the retrieved treated aggregates is ≤10 vol.-%, in particular 5 vol.-%, especially 2 vol.-%, preferably 0.1-3 vol.-% or 1-3 vol.-% 1.5-2 vol.-%.

Especially, the powdery mineral material and the treated aggregates are separated at a characteristic cut-off grain size. Preferably the cut-off grain size is between 0.06-1 mm, especially, 0.1-0.5 mm, preferably at 0.125 mm or at 0.250 mm. This means that particles below the cut-off grain size are collected as powdery mineral material while particles with a size above the cut-off grain size are collected as aggregates.

The powdery mineral material comprises or consists of the powdery disintegration product. Optionally, the powdery mineral material may comprise small aggregates with a grain size below the cut-off grain size and/or untreated hardened mineral binder with a grain size below the cut-off grain size.

Separation of the powdery mineral material from the treated aggregates is in particular done by filtration, sieving, sedimentation, density separation and/or centrifugation.

The treatment can be done in a batch process or in a continuous process.

According to a highly preferred embodiment, the source material can for example be immersed in an aqueous liquid, e.g. water, in a reaction vessel, e.g. with a concentration of 0.5-5 kg source material per liter of liquid, and treated with carbon dioxide under agitation or abrasive conditions. For example, the carbon dioxide can be introduced into the reaction vessel through an inlet which allows to introduce the carbon dioxide in gaseous form directly in to the aqueous liquid. Thus, the gaseous carbon dioxide is dissolved in water and reacts with the hardened binder material under agitation and abrasive conditions in order to produce the disintegration product or powdery mineral material, respectively. Preferably the reaction vessel is agitated and/or comprises a mechanical stirrer for agitating the reaction mixture and effecting abrasive conditions. Separation of the powdery mineral material from the treated aggregates is then in particular done by filtration.

According to a preferred embodiment, the powdery building material and/or the aggregates obtained in the method of the invention are dried after separation. This is especially useful, if the treatment has been performed under wet conditions or in a liquid.

This can e.g. be done in an oven, in particular at a temperature of 30-150° C., preferably at 80-130° C. or 100-120° C. As well, drying with the help of a stream of air, especially a stream of hot air, for example with a temperature of 30-150° C. is a further option. This results in a fast drying of the powdery mineral material and/or the aggregates. However, it is for example also possible to dry the products under ambient conditions without further measures. This does not require any additional energy.

However, the powdery building material can also be collected as a stable suspension and used in that form. This as well does not require any additional energy and enables to reduce water consumption.

If the treatment has been performed under wet conditions or in a liquid and the fines have been separated from the liquid phase, this liquid phase can be reused/recycled for a further treatment according to the present invention.

Another aspect of the present invention is concerned with aggregates obtainable by the method of the present invention. These aggregates are in particular distinguishable from fresh or neat aggregates in that they may carry a minimal amount residual hardened binder material on the surface. In the present context, fresh or neat aggregates are aggregates which in particular have never been brought into contact with mineral binder material, especially with cementitious material.

Typically, the aggregates comprise hardened mineral binder in an amount from 0.0001-25 wt.-%, preferably 0.01-10 wt.-%, especially 0.01-1 wt.-%, with respect to the overall weight of the aggregates.

In particular, a porosity, measured according to norm EN 1097-6 of the aggregates is ≤10 vol.-%, in particular ≤5 vol.-%, especially ≤2 vol.-%. Typically the porosity is ≥0.1 vol.-%, especially ≤1 vol.-%. Preferably the porosity is 1.5-2 vol.-%.

Preferably, the aggregates have a particle size of at least 125 μm or at least 250 μm.

Furthermore, the present invention is also directed to a powdery mineral material obtainable by the method of the present invention.

The powdery building material is in particular a particulate material.

Especially, the powdery mineral material has a particle size below 250 μm, preferably below 125 μm. A fineness of the powdery mineral material is in particular in the range from 0.5-1000 $m^2/g$, preferably 0.5-500 $m^2/g$, especially 0.5-100 $m^2/g$. The fineness refers to surface area calculated from nitrogen sorption (BET).

In particular, the powdery mineral material comprises or consists of carbonated hydrates of the cementitious hardened binder, optionally with remaining hydrates and/or oxides, e.g. quartz. Optionally aluminate products and/or sulphates may be present as well.

In particular, the powdery mineral material has the same oxide composition as the hardened binder and fractions of aggregates with a grain size below the cut-off grain size, e.g. below 250 μm or below 125 μm.

Such powdery mineral material with particle sizes in the nano- to micrometer scale and/or a high specific surface area are in particular advantageous when used as filler and/or supplementary cementitious material and/or raw material for cement production and/or ash improvement technology. The fineness of the powdery building material can especially increase the kinetics of early hydration of cementitious systems. Moreover, such materials do not have to be grinded for use in binder compositions. Thus, the powdery building materials retrieved can e.g. easily be blended with cement without any additional effort.

The aggregates and/or the powdery mineral material obtainable by the method of the invention can advantageously be used for producing binder composition, especially hydraulically settable compositions, in particular mortar and/or concrete compositions.

The powdery mineral material which is obtainable by the method of the present invention can preferably be used as filler and/or supplementary cementitious material, in particular for producing hydraulically settable compositions, especially mortar and/or concrete compositions.

A further aspect of the present invention relates to a method for producing hydraulically settable compositions, especially mortar or concrete compositions, comprising the steps of (i) retrieving aggregates according to the method as defined above and (ii) mixing the retrieved aggregates with mineral binder, in particular hydraulic binder, and optionally further aggregates and/or water.

Similarly, a method for producing hydraulically settable compositions comprises the steps of (i) retrieving powdery mineral material according to the method as defined above and (ii) mixing the retrieved powdery mineral material with aggregates, and optionally further mineral binder and/or water.

When omitting the addition of water in the above mentioned methods it is for example possible to produce dry mortar or concrete compositions.

When additionally adding water, workable hydraulically settable compositions can be produced, e.g. mortar or concrete compositions. The ratio of water to binder in the compositions may be chosen in the range of 0.2-0.8, especially 0.3-0.6, preferably, 0.3-0.5.

Figure 1:
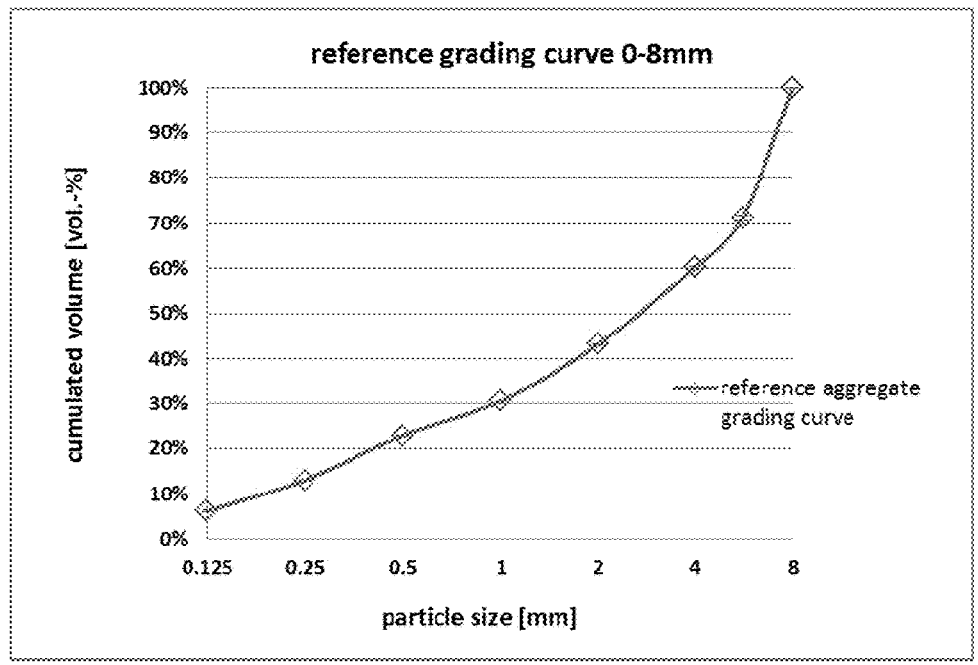
FIG. 1 Grading curve of the aggregates used in concrete mixes.

Further advantageous configurations of the invention are evident from the exemplary embodiments.

EXEMPLARY EMBODIMENTS

1. Treatment of Waste Concrete

As source material, demolition material from demolished buildings was retrieved from a local supplier. The demolition material consisted of crushed concrete made of cement and aggregates with grain sizes of 0-32 mm.

70 kg of crushed concrete was immersed in 30 l of water and treated in a mixing device (concrete mixer) under continuous mixing and continuous flow of gaseous carbon dioxide at a temperature of 20° C. and atmospheric pressure. Pressurized carbon dioxide gas was introduced directly into the liquid water. Thereby bubbles of carbon dioxide in the water could be observed. During the treatment a continuous flow of water served to remove suspended carbonation products and small aggregate particles (=powdery mineral material) from the mixing device into a filtering system. In the filtering system, the turbid suspension containing carbonation products in the form of powderous fines and small aggregate particles was filtered with a filter of 125 μm opening size. Thus, small aggregates with a particle size of 125 μm were retained in the filter while smaller particles passed the filter with the water. Thereafter, the liquid suspension of the carbonation products was filtered once more in order to remove the water from the inorganic powder.

The process was stopped when the water directed to the filter system did not anymore comprise visible amounts of particles (clear solution, no visible turbidity) and the treated aggregates did not anymore comprise visible amounts of hydrated cement on their surface.

Subsequently, the aggregates were removed from the concrete mixer.

Next, the aggregates as well as the powdery mineral material were dried at a temperature of 110° C. in an oven.

Finally, the dried powdery mineral material was stored in a receptacle. The dried aggregates were separated into several classes of particle sizes and stored in individual receptacles.

2. Powdery Mineral Material 2.1 Characterization

The powdery mineral material was characterized with regard to specific surface area (SSA) as well as density. The specific surface area was measured using nitrogen sorption (BET) and densities were determined using a helium picnometer. Table 1 gives an overview of the results.

TABLE 1

| Properties of carbonation products | | |
|---|---|---|
| particle size range [—] | SSA [m²/g] | density [g/cm³] |
| 0-63 μm | 12.85 | |
| 63-125 μm | 9.98 | 2.49 |
| 125-250 μm | — | |

2.2 Impact on Cement Paste Rheology

The impact of the powdery mineral material (named "PMM" in the following examples) on the rheology of a binder paste was studied using two basic composite binder systems. The binder systems are based on (i) CEM II A binders and (ii) CEM II B binders (according to norm EN 197).

As reference, binders comprising Portland cement (CEM I) and 18 wt.-% of limestone or 34 wt.-% of limestone, respectively, were used. In the following, these composite binders are called type CEM II A-L binders (with 18 wt.-% limestone) or CEM II B-L binders (with 34 wt.-% limestone).

The powdery mineral material (PMM) was used as replacement for limestone in the above mentioned binder systems. Thereby, the inorganic powder was dosed to replace the equivalent volume of limestone. The thus produced composite binders are called "CEM II A-PMM" and "CEM II B-PMM", respectively. Mixing water for all binders as well as the total volume of solids was kept constant to enable sound comparison of rheological parameters, i.e. spread flow. Table 2 gives an overview of the binder systems and flow properties of the cement pastes. The flow spread has been measured using a cylindrical cone of 99 cm³.

TABLE 2

| | Composition and properties of composite binders and paste per 100 g of binder | | | | | | | | | | | |
|---|---|---|---|---|---|---|---|---|---|---|---|---|
| | paste components | | | | | | | | | | spread flow | |
| | CEM I | | | | lime stone | | PMM | | binder | water | avg | sd |
| composite binder type | [g] | [wt.-% o.b.] | [ml] | [vol.-%] | [g] | [ml] | [g] | [ml] | [ml] | [ml] | [mm] | [mm] |
| CEM II A - L | 80 | 82% | 25.4 | 80% | 17.5 | 6.4 | | | 31.7 | 40 | 107 | 0.0 |
| CEM II B - L | 63 | 66% | 20.0 | 63% | 32.4 | 11.8 | | | 31.7 | 40 | 121 | 1.0 |
| CEM II A - PMM * | 80 | 83% | 25.4 | 80% | — | — | 15.9 | 6.4 | 31.7 | 40 | 115 | 1.3 |
| CEM II B - PMM * | 63 | 68% | 20.0 | 63% | — | — | 29.3 | 11.8 | 31.7 | 40 | 124 | 1.3 |

* volume adequate exchange of composite

As can be deduced from table 2, the powdery mineral material does not negatively impact the flow behaviour of the cement pastes. Thus, the powdery mineral material can be used as cement replacement or filler for cementitious binders.

2.3 Impact on Mortar Theology

The composite binders as described above in chapter 2.2 have been used as binder components in mortar compositions. The mortars were produced with a water/binder ratio of ~0.5 and sand of 0-2 mm grain size.

Mortars produced with cements of type CEM II A-L and mortars produced with CEM II A-PMM showed an essentially constant flow table spread of 198±3 mm.

Similarly, mortars produced with cements of type CEM II B-L and mortars produced with CEM II B-PMM showed an essentially constant flow table spread of 195±3 mm.

Hence, the powdery mineral material does not compromise the rheology of mortar compositions.

3. Aggregates 3.1 Water Sorption

Water sorption of the aggregates derived from the inventive process described in chapter 1 has been determined according to norm EN 1097-6. For reasons of comparison, the water sorption of untreated as well as neat or nominal aggregates of similar size has been measured as well. Table 3 gives an overview of the results.

Thus, with regard to water sorption, the treatment according to the invention clearly results in aggregates with very low water sorption which is very close to neat or nominal aggregates.

3.1 Density and Porosity

Density and apparent density of aggregates are direct measures for the quality of the material. The lower the density of the aggregates the more residual hydrated binder material the recycling aggregates carry. Water filled porosity of the individual particles is derived from the density difference between the dry and the water saturated state and is a mirror image of the water sorption capacity expressed in terms of volume units.

From these parameters, a cleaning effect can be calculated based on the reduction of water filled porosity in the treated material from the level of the appropriate particle size class of the untreated material towards the level of the nominal aggregates.

Densities and apparent densities of the aggregates derived from the inventive process described in chapter 1 have been determined according to norm EN 1097-6. For reasons of comparison, the densities of untreated as well as neat or nominal aggregates of similar size has been measured as well. Table 4 gives an overview of the results.

TABLE 4

Densities and porosities of untreated aggregates and treated aggregates in comparison to nominal aggregates.

| | density & porosity | | | | | | | | | |
|---|---|---|---|---|---|---|---|---|---|---|
| | untreated | | | treated | | | neat | | | |
| particle size fraction [$d_{min}$-$d_{max}$] | density; ovendry 110° C. [g/cm$^3$] | apparent density; water saturated [g/cm$^3$] | water filled porosity; saturated [vol.-%] | density; ovendry 110° C. [g/cm$^3$] | apparent density; water saturated [g/cm$^3$] | water filled porosity; saturated [vol.-%] | density; ovendry 110° C. [g/cm$^3$] | apparent density; water saturated [g/cm$^3$] | water filled porosity; saturated [vol.-%] | cleaning effect [wt.-%] |
| up to 4 mm | 2.68 | 2.40 | 10.2% | 2.67 | 2.62 | 1.6% | 2.704 | 2.669 | 1.3% | 96% |
| 4 mm-5.6 mm | 2.68 | 2.44 | 8.9% | 2.66 | 2.61 | 2.0% | 2.655 | 2.627 | 1.1% | 88% |
| 5.6 mm-8 mm | 2.63 | 2.42 | 7.8% | 2.70 | 2.64 | 2.1% | 2.671 | 2.644 | 1.0% | 84% |
| 8 mm-12 mm | 2.63 | 2.40 | 8.8% | 2.70 | 2.64 | 2.3% | | | * 1% | 83% |
| 12 mm-16 mm | 2.55 | 2.35 | 7.7% | 2.51 | 2.47 | 1.7% | | | * 1% | 90% |
| 16 mm-22 mm | 2.70 | 2.46 | 8.8% | 2.70 | 2.65 | 1.8% | | | * 1% | 90% |
| 22 mm-32 mm | 2.40 | 2.22 | 7.5% | 2.69 | 2.63 | 2.3% | | | * 1% | 80% |
| 32 mm-45 mm | 2.40 | 2.24 | 6.7% | | | | | | | |

* assuming 1% water filled porosity; saturated for neat aggregate d >8 mm

TABLE 3

Water sorption of untreated, treated (according to the invention) and neat aggregates.

| | water sorption of aggregates | | | cleaning effect [wt.-%] |
|---|---|---|---|---|
| particle size fraction [$d_{min}$-$d_{max}$] | untreated [wt.-%] | treated [wt.-%] | neat [wt.-%] | |
| up to 4 mm | 7.26% | 0.98% | 0.77% | 97% |
| 4 mm-5.6 mm | 6.20% | 1.27% | 0.66% | 89% |
| 5.6 mm-8 mm | 5.46% | 1.30% | 0.62% | 86% |
| 8 mm-12 mm | 6.28% | 1.41% | *0.6% | 86% |
| 12 mm-16 mm | 5.72% | 1.15% | *0.6% | 89% |
| 16 mm-22 mm | 6.01% | 1.10% | *0.6% | 91% |
| 22 mm-32 mm | 6.14% | 1.41% | *0.6% | 85% |
| 32 mm-45 mm | 5.38% | | | |

*assuming 0.6% water sorption for neat aggregate d >8 mm

4. Performance of Treated Aggregates in Concrete 4.1 Mix Design

In order to check the suitability of aggregates obtained by the inventive method, test with concrete compositions have been carried out. The concrete mix used is given in table 5. "Paste content" stands for cement plus water, i.e. the cement paste. Binder (standard CEM I 42.5 N) as well as the mix water content (w/c=0.4) were kept constant for all concretes produced.

| mix design concrete | | |
|---|---|---|
| w/c | 0.4 | [—] |
| paste content | 31.4% | [vol.-%] |
| aggregate content | 68.6% | [vol.-%] |
| CEM I 42.5 N | 438 | [kg/m$^3$] |
| water | 175 | [kg/m$^3$] |

With regard to the aggregates, a grading curve with a maximum grain size of 8 mm has been chosen for the tests. The reference grading curve is displayed in FIG. 1. In FIG.

1, particle size distribution is expressed as cumulated volume of maximum particle size. Based on the density of materials in dry state (according to EN 1097-6) the respective grading curves were composed by weight fractions of suitable particles size classes.

4.2 Properties of Fresh Concrete

Aggregates, cement and water have been mixed in a known manner. In order to enhance the flow behaviour of the fresh concrete, a superplasticizer (Viscocrete 3081; available from Sika, Switzerland), was added to the water before mixing. Viscocrete 3081 is a plasticizer based on a comb copolymer with polycarboxylate backbone and polyether side chains.

Subsequently, the flow table spread has been measured according to EN 1015-3.

Figure 2:
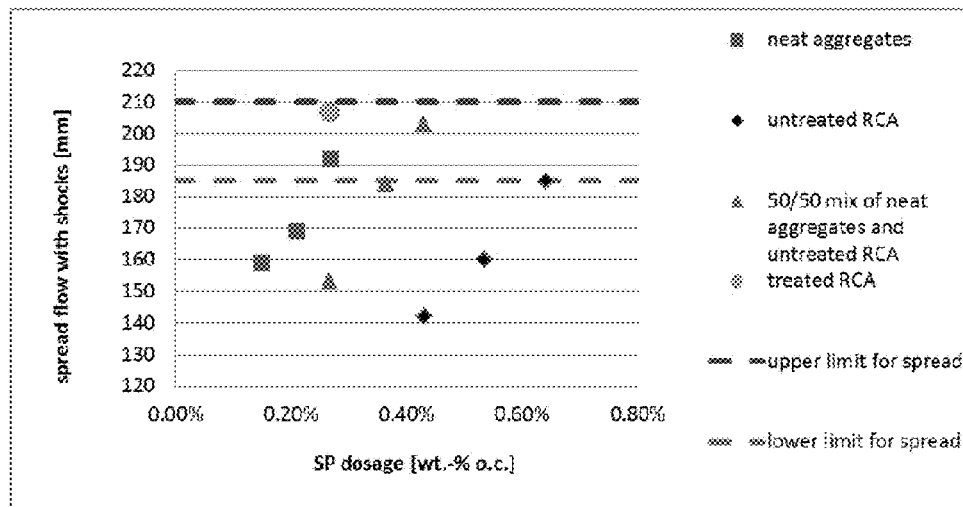
FIG. 2 Superplasticizer demand to achieve flow table spread within a desired range.

FIG. 2 shows the results of various different concrete compositions. As can be deduced from FIG. 2, a concentration of 0.25 wt.-% of superplasticizer (with respect to cement weight) is sufficient to achieve a flow spread in range of 185-210 mm (this is considered to be a suitable range in practice) when using neat or nominal aggregates. Similar flow behaviour can be found when using aggregates that have been obtained by the process of the invention (treated RCA; "RCA" stands for recycled concrete aggregates).

When using untreated aggregates (untreated RCA; not treated according to the inventive method), the superplasticizer demand significantly increases. In order to achieve a flow spread of 185 mm, 0.65 wt.-% superplasticizer is required. This is about 2.6 times more when compared to neat aggregates which is clearly disadvantageous.

A mix of neat and untreated aggregates results in an intermediate superplasticizer demand which is still not comparable to neat or treated aggregates.

4.3 Mechanical Properties of Concrete

In order to investigate the influence of the aggregates on the mechanical properties of hardened concrete, the compressive strengths of several concrete samples have been tested. The concrete samples were produced according to the mix design as described above. Thus, apart from the different type of aggregates, all samples were produced identically. Compressive strengths have been measured on prisms 4×4×16 cm$^3$ according to EN 196-1.

Figure 3:
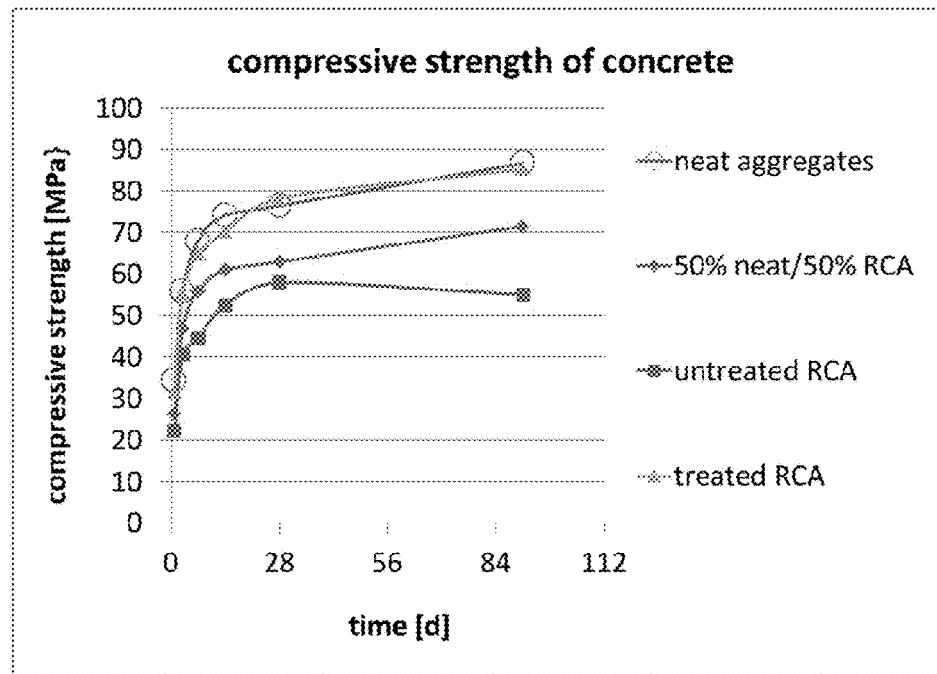
FIG. 3 Compressive strength of concrete samples.

FIG. 3 shows the time evolution of the compressive strengths of the testes samples up to 90 days. Concrete samples based on aggregates which have been treated according to the method of the invention (treated RCA) behave very similar to samples with neat aggregates. Untreated aggregates (untreated RCA) show significantly lower compressive strengths. A mix of untreated and neat aggregates results in intermediate compressive strengths.

Figure 4:
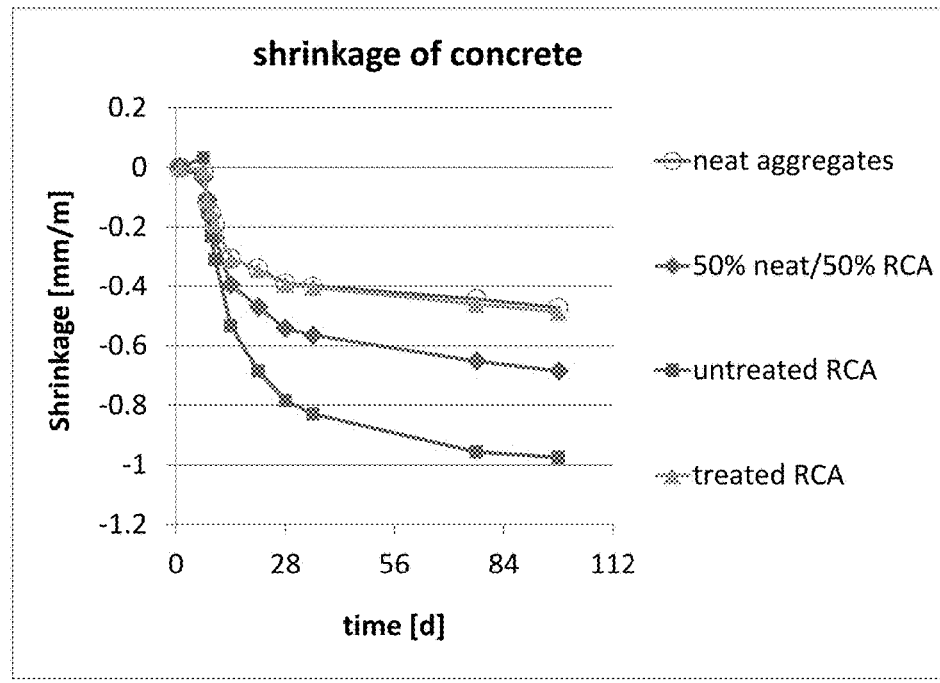
FIG. 4 Drying shrinkage of concrete samples.

FIG. 4 shows the time evolution of drying shrinkage of the test samples up to 90 days. Drying shrinkage of concrete originates from the porosity of the hydrated binder matrix and its volume fraction in concrete. It is widely agreed and state of the art that using normal recycled aggregates from crushed concrete means an increase of the total volume of hydrated binder matrix (new binder and residual binder of the recycling aggregates). This is the main reason for the increased drying shrinkage of concrete produced with crushed recycled concrete aggregates.

In FIG. 4 it can be seen that concrete samples based on aggregates which have been treated according to the method of the invention (treated RCA) behave very similar to samples with neat aggregates. However, concrete with untreated aggregates (untreated RCA) show significantly higher drying shrinkage. A mix of untreated and neat aggregates results in intermediate shrinkage.

Overall, aggregates treated according to the method of the invention are nearly as good as neat or fresh aggregates. Consequently, such aggregates constitute a valuable and advantageous alternative to fresh aggregates.

However, it will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. Method for retrieving aggregates and/or powdery mineral material from a source material having hardened mineral binder and aggregates, the method comprising:
   a) treating the source material in a disintegration process, wherein the hardened mineral binder is at least partially, carbonated and removed from a surface of the aggregates such that a powdery disintegration product is produced; and
   b) separating the treated source material at a predefined cut-off grain size in order to retrieve treated aggregates with a grain size of at least the predefined cut-off grain size and/or in order to retrieve powdery mineral material with a grain size below the predefined cut-off grain size,
   wherein in step a), a density of solid material in a processing volume is about 10-80 vol.-%.

2. Method according to claim 1, wherein the source material comprises hardened mortar and/or concrete.

3. Method according to claim 1, wherein in step a), the at least partially carbonated hardened mineral binder is removed from the surface of the aggregates by mechanical abrasion and/or attrition.

4. Method according to claim 1, wherein the density is 40-60 vol.-%.

5. Method according to claim 1, wherein the treating of the source material further includes agitation of the source material.

6. Method according to claim 1, wherein the treating of the source material takes place in water or other liquid, and wherein the carbonation includes addition of gaseous carbon dioxide.

7. Method according to claim 6, wherein the gaseous carbon dioxide is added into the water or other liquid.

8. Method according to claim 1, wherein the powdery mineral material and the treated aggregates are separated at a characteristic cut-off grain size between 0.06-0.5 mm.

9. Method according to claim 1, wherein the treatment of the source material in step a) is performed until an amount of hardened mineral binder and carbonated hardened mineral binder bound to the aggregates is 0.0001-50 wt.-%, with respect to an overall weight of neat aggregates.

10. Method according to claim 1, wherein the treatment in step a) is performed until a porosity, measured according to norm EN 1097-6, of the retrieved treated aggregates is ≤10 vol. %.

11. Method according to claim 1, wherein the source material is a waste or demolition material, the hardened mineral binder is completely carbonated, and the treating is performed under abrasive conditions.

12. Method according to claim 11, wherein the source material consists of hardened mortar and/or concrete.

13. Method according to claim 1, wherein the powdery mineral material and the treated aggregates are separated at a characteristic cut-off grain size between 0.125-0.250 mm.

14. Method according to claim 1, wherein the treatment of the source material in step a) is performed until an amount of hardened mineral binder and carbonated mineral binder bound to the aggregates is 0.01-1 wt.-%, with respect to an overall weight of neat aggregates.

15. A method according to claim 1, wherein the treatment in step a) is performed until an amount of hardened mineral binder and carbonated hardened mineral binder bound to the aggregates is 0.001-25 wt.-%, with respect to the overall weight of the aggregates.

16. A method according to claim 1, wherein the treatment in step a) is performed until an amount of hardened mineral binder and carbonated hardened mineral binder bound to the aggregates is 0.01-1 wt.-%, with respect to the overall weight of the aggregates.

17. Method for producing hydraulically settable compositions, comprising:
(i) performing the method according to claim 1 to retrieve aggregates; and
(ii) mixing the aggregates with a mineral binder and optionally water.

18. Method for producing hydraulically settable compositions, comprising:
(i) performing the method according to claim 1 to retrieve powdery mineral material; and
(ii) mixing the powdery mineral material with aggregates, and optionally water.

19. Aggregates obtained by a process according to claim 1, which have a porosity, measured according to norm EN 1097-6, of ≥0.1 vol.-% and ≤10 vol.-%.

20. Composition including, mortar or concrete comprising:
c) aggregates according to claim 19; and
d) a mineral binder.

21. Aggregates according to claim 19, wherein the porosity is 1.5-2 vol.-%.

22. Aggregates according to claim 19, which has a porosity of 0.1-3 vol.-%.

23. Aggregates according to claim 19, which has a porosity of ≥1 vol.-% and ≤2 vol.-%.

24. Aggregates according to claim 19, which comprise hardened mineral binder in an amount from 0.0001-25 wt.-%, with respect to the overall weight of the aggregates.

25. Aggregates according to claim 19, which comprise hardened mineral binder in an amount from 0.01-1 wt.-%, with respect to the overall weight of the aggregates.

26. A powdery mineral material obtained by a process according to claim 1, which has a fineness of 0.5-1000 $m^2/g$ and a particle size below 250 μm.

27. Powdery mineral material according to claim 26, wherein the fineness is 0.5-100 $m^2/g$.

* * * * *